United States Patent [19]
Eastes

[11] 3,790,402
[45] Feb. 5, 1974

[54] SARAN-ALUMINUM SILICATE COATING
[75] Inventor: Frank E. Eastes, Spartanburg, S.C.
[73] Assignee: W. R. Grace & Co., Duncan, S.C.
[22] Filed: Sept. 4, 1970
[21] Appl. No.: 69,955

[52] U.S. Cl...... 117/68, 117/138.8 E, 117/155 UA, 117/158
[51] Int. Cl............................................. D21h 1/28
[58] Field of Search... 117/68, 138.8 A, 138.8 E, 117/155 UA, 161 UH

[56] References Cited
UNITED STATES PATENTS
| | | | |
|---|---|---|---|
| 2,956,671 | 10/1960 | Cornwell | 117/68 X |
| 3,161,532 | 12/1964 | Sill | 117/68 |
| 2,711,996 | 6/1955 | Hofrichter | 260/23 |
| 2,525,671 | 10/1960 | Hauser | 260/28.5 |
| 3,347,697 | 10/1967 | Gmitro | 117/68 X |
| 3,459,582 | 8/1969 | Swerlick | 117/68 |

FOREIGN PATENTS OR APPLICATIONS
763,390   7/1967   Canada............................ 117/138.8

Primary Examiner—William D. Martin
Assistant Examiner—M. R. Lusignan
Attorney, Agent, or Firm—John J. Toney; William D. Lee, Jr.

[57] ABSTRACT

A coating material particularly useful for coated sheet products of paper and plastic is a blend of aluminum silicate and a copolymer of vinylidene chloride. This coating has good optics and heat seal characteristics with good gas and moisture vapor permeability. The blend in its usual form also contains a wax such as carnauba wax as an essential ingredient. The products including the coating and the process for forming the products.

4 Claims, No Drawings

SARAN-ALUMINUM SILICATE COATING

BACKGROUND OF THE INVENTION

This invention relates to coatings and more particularly to coatings of sheet type materials that provide good heat seal and optic characteristics with good gas and moisture vapor permeability.

The present invention is of particular value in coating paper sheet products such as those used to enclose breakfast cereals. The side of such paper sheets that will face inwardly toward the cereal product is usually coated with a barrier saran of crystalline characteristic. This saran or vinylidene chloride copolymer has well known moisture and gas barrier characteristics to protect the contents interior of the wrapper. The paper itself is typically porous and contains a significant amount of moisture. Typically the outside face of this paper is coated with a vinyl lacquer which has good heat sealed characteristics and allows the escape of the trapped moisture. This outer coating is a substantial item in the cost of the wrapping material. It also has poor scuff and grease resistance.

Coatings have also been applied to plastic films to improve their heat sealability. However, the various compositions used in the past have generally suffered from the deficiencies of excessive blocking, poor "hot slip" properties or poor clarity. In many cases the coating suffered from all three of these deficiencies.

"Blocking" as used herein refers to the tendency of the film to adhere to itself when two or more surfaces of the film are held pressed together, for example when sheets of the film are stacked in storage. "Hot slip" is the tendency of the film to release from heated surfaces it ordinarily sticks to.

Laminates made by combining one-side heat seal coated polypropylene with two-side saran coated cellophane or glassine are used extensively in form and fill bags, for snack foods, having overlap back seals. To the best of my knowledge present commercial one-side heat seal coated polypropylene films are not completely satisfactory because they will heat seal to only certain select saran coated cellophanes and glassines, and their slip and hot release properties are only fair. There is, therefore, a need for a one-side heat seal coated polypropylene having improved slip and hot release properties and universal heat sealability to all types of saran coated cellophanes and glassines.

Some exemplary prior art coatings may be found in U.S. Pat. Nos. 3,088,844 and 3,397,163. These patents show the coating of plastic films with coatings containing significant amounts of a copolymer of vinylidene chloride. Inorganic materials such as those shown in U.S. Pat. No. 3,088,844, top of column 6, for example diatomaceous earth would cause a very substantial hazy look at only about a 2 percent content.

SUMMARY OF THE INVENTION

By an aspect of the invention a composition of matter is provided that is a blend of aluminum silicate and a copolymer of saran type vinylidene chloride in a weight ratio of 3 parts of aluminum silicate to 100 parts of saran resin to 50 parts of aluminum silicate to 100 parts of saran resin which shall be expressed hereinafter as 3–50/100. In the usual case this composition contains as an essential ingredient a wax component preferably of the nature of a natural occurring wax having a melting point within the range of 150°–212°F. and most preferably carnauba wax.

By other aspects of my invention a coated article is provided and a process is provided where a coating is provided on a base and the coating is a blend of aluminum silicate and a copolymer of vinylidene chloride.

In one specie of this aspect the base is a sheet paper product, the coating copolymer includes 50–95 percent by weight vinylidene chloride, the aluminum silicate/saran weight ratio is 10–50/100 and the coating is permeable to gas and moisture vapor.

In a second specie of this apsect the base is a plastic film the coating polymer includes 50–95 percent by weight vinylidene chloride and the aluminum silicate/saran weight ratio is 3–15/100.

Accordingly, it is an object of this invention to provide a new coating having characteristics which make it particularly useful for application to paper and plastic sheet products. This coating is economical and provides superior heat seal, hot slip, and blocking properties with excellent freedom from haze and good permeability to gas and moisture vapor. The sheet materials so produced handle well and when sealed form peelable heat seals under a variety of sealing conditions. A further object is to provide an expeditious means for producing such coated articles.

APPLICANT'S BEST MODE

By this invention a coated article is provided in which a base material, usually in the nature of a sheet of paper or a plastic film, is coated with a composition of matter having as essential ingredients aluminum silicate and a copolymer of vinylidene chloride in a weight ratio of 3–50/100. In the usual instance another essential ingredient of the composition is a wax, preferably of the nature of a natural occurring wax, having a melting point within the range of 150°–212°F., more preferably carnauba wax, in a wax to copolymer of vinylidene chloride weight ratio of 1.5–3/100. In its preferred and most optimal operable forms the coating copolymer includes 50–95 percent by weight vinylidene chloride and more preferably 60–85 percent by weight vinylidene chloride.

The coating copolymer is a copolymer of vinylidene chloride and as used herein this refers to saran as that term is used in its normal commercial sense with reference to copolymers containing vinylidene chloride. As examples of copolymerizable materials there can be used one or more of the following vinyl chloride, acrylonitrile, vinyl acetate, ethyl acrylate, methyl methacrylate and so on. Thus terpolymers and other multiple polymers are also included for example, a terpolymer of vinylidene chloride, diamethyl maleate and vinyl chloride.

As used herein a Water Vapor Transmission Rate of 4 grams/24 hrs./1 sq. m./sample of coating at 100°F, 90% R. H. (A.S.T.M. E 96 Method E) is considered permeable and 10 grams/24 hrs./1 sq. m./sample of coating at 100°F 90% R. H. (A.S.T.M. E 96 Method E) is considered the preferable minimum permeability.

As used herein an Oxygen Gas Transmission Rate of 45 cc/sample of coating/1 sq. m./24 hrs./1 atm. at 73°F, 0% R. H. (A.S.T.M. D 1434) is considered gas permeable and 100 cc/sample of coating/1 sq. m./24 hrs./1 atm. at 73°F, 0% R. H. (A.S.T.M. D 1434) is considered the preferable minimum permeability.

Synthetic waxes such as hydrogenated castor oil, fluorinated hydrocarbon waxes, and long chain fatty acid amides and the like may be used. In general the waxes should melt at temperatures above the maximum temperatures encountered in the storage of the film and should not be soluble in the copolymer at these temperatures. Specific examples of natural waxes other than the preferred carnauba wax are montan wax, candelilla wax and ozocerite. Other materials which may be added as wax substitutes in special situations are finely divided high polymers which soften at temperatures above the maximum storage temperatures and are not soluble in the copolymer.

When the coating composition is to be applied to paper products and the like which have significant porosity and retained moisture and the like the coating should have an aluminum silicate/saran weight ratio of 10–50/100 and more preferably 20–40/100 and have good permeability to gas and moisture vapor. A dry coating of between 0.02 to 1 mil thick is optimal with a coating thickness of 0.02 to 0.5 mil thick being preferred in being sufficiently thick to give good heat sealability, permeation of gases such as oxygen, carbon dioxide and the like and to moisture vapor, good hot slip properties and anti-blocking properties.

The invention is particularly advantageous with paper products that are to be used in wrapping food items such as the wrapping inside of breakfast cereal boxes wherein the inside face of the paper is coated with a barrier saran material and the paper is of either glassine or bleached kraft of 10–20 lb/3,000 ft. basic weight. This coated or laminate product has good foldability, stiffness, machinability, heat sealability and ability to form strong yet peelable heat seal under a variety of sealing conditions with good hot slip characteristics.

When the coating composition is to be applied to plastic films and the like the aluminum silicate/saran weight ratio should be 3–15/100. A dry coating of between 0.02 to 0.5 mil thick is optimal with a coating thickness of 0.02 to 0.2 mil thick being preferred in being sufficiently thick to give the requisite good heat sealability with good peelability under a variety of sealing conditions and good hot slip characteristics. The coating is permeable to gas and to moisture vapor although not as much so as with the coatings of higher aluminum silicate content.

Of particular importance is the fact that the coating has good clarity or freedom from haze. While this offers advantage even when applied to paper it offers particular advantage when applied to films that are tinted, colored or clear. Obviously, when a film having good clarity is coated with a hazy coating the clarity of the base film is defeated. By observation the optics of my coating are such that even with a 30–40 percent aluminum silicate load in the dried coating, little difference can be observed with the unaided eye in haziness between a loaded sample of the coating and an unloaded sample of the coating. This coating is therefore particularly valuable for use with plastic film that is haze free because the coating is also substantially haze free providing a laminate substantially free of haze and having good clarity. The coating is particularly desirable for application to polyolefins and in particular to polypropylene which itself normally has poor heat seal qualities.

Generally the polyolefin substrate or base is itself in the form of a film which by way of example may be from 0.25 up to 5 mil in thickness with a preferred film thickness of from about 0.5 to 1.5 mil. It is to be understood however that films and sheet materials of either lesser or greater thickness can be treated in accordance with this invention. The polyolefin film employed is generally necessarily of the type which softens or melts at temperatures sufficiently above the required sealing temperature of the copolymer coatings so that the polyolefin base substrate will not melt or become excessively weak under the operating conditions of automatic machinery or other sealing equipment in which the coated wrapping material is to be employed. It is considered to be a particular advantage, in light of the current conditions prevailing in the wrapping and packaging art to employ a base polyolefin substrate, as for example polypropylene film which has a melting or soften point of at least 300°F.

Although the invention is particularly concerned with sheet or film materials broadly speaking the coating disclosed herein and the process disclosed may be used, for instance, to improve the surface characteristics, and particularly, heat sealability and optics of sheets, films, filaments, fibers, monofilaments, irregular coated articles and cardboard.

For all items of food packaging, it is also necessary that the copolymer coatings and other components contained in the coating be non-toxic and essentially odor free.

The aluminum silicate is usually in the form of thin flat platelets and the preferred overall average particle size is between 0.25 and 5 microns although other particle sizes are operable in proper circumstances.

In carrying out the process of this invention for providing good heat sealability by coating a porous base material with the blend of a copolymer of vinylidene chloride and aluminum silicate no surface treatment or priming is generally necessary. This is particularly true when paper products are to be coated. When a plastic film is to be coated it is usually preferably pretreated by flame or corona treatment and then primed with a material such as polyurethane, polyester or polyamide. The film can be pretreated in other manners such as for example by oxidation through chemical treatment. For best results on films such as polypropylene it is usually necessary to oxidize the film and then prime it immediately prior to coating to improve coating adhesion.

To achieve the best results, the coating of the substrate with the coating composition is done from an acqueous dispersion containing the copolymer substance and the other ingredients thoroughly dispersed therein. The copolymer is preferably applied to the film or other substrate from a dispersion containing 35–50 percent total solids.

The preferred aqueous copolymer dispersion is then applied to the appropriately treated polyolefin structure or paper structure in any convenient and known manner, as by dipping, spraying, brushing, roll coating, gravure coating, etc., preferably at a temperature of 60°–150°F. If necessary excess aqueous solution may be removed by squeeze rolls, doctor knives, etc. The coating composition should be applied in such amount that there will be deposited upon drying, a smooth evenly distributed layer of the thickness previously described depending on the substrate material. The coating is subsequently dried by hot air, radiant heat or by other convenient means. Upon drying a non-water soluble, clear, adherent, glossy coating is left.

It is also possible to add the coating from a non-aqueous solution using for example, alcohols, ketones, esters, aldehydes, hydrocarbons, etc. particularly when solvent recovery equipment is available; also, explosion proof equipment should be used. However, in organic solutions it is difficult to keep colloidal inorganic material well dispersed and hence the resulting coated products tend to be inferior to those deposited from an aqueous system.

EXAMPLE I

A laminate of this invention is prepared by preparing a coating composition of matter of this invention in the following manner. 8,750 grams of a saran latex dispersion (Mortons AX 6,000, Morton Chemical Company, Chicago, Illinois) was charged into a stainless steel tank equipped with an agitator. The dispersion contained 40 percent by weight saran latex. The copolymer was 72.5 percent vinylidene chloride.

Next 175 grams of aluminum silicate (ASP 100, Minerals and Chemical Division of Engelhard Minerals and Chemical Corp. McIntyre, Georgia) having an average platelet type particle size of 0.5 microns is wet out with about 500 cc of the saran latex dispersion in a Warring blender. The wet out powder is then added to the saran latex dispersion and mixed in. This gives an aluminum silicate/saran weight ratio of 5/100.

Next 70 grams of carnauba wax is emulsified in a water solution containing 5 percent sodiumdodeselbenzensulfanate wetting agent (Nacconol 90°F, Allied Chemical Corporation, Morristown, New Jersey). Flakes of the carnauba wax are slowly added to the solution in a Warring blender at a solution temperature of 200°F until after a complete dispersion is visually observed. The dispersion is cooled under agitation. The carnauba wax emulsion is then added to the saran latex batch. The batch is then adjusted to 10,000 grams by the addition of water.

Next a coated polypropylene film is formed. A roll of 75 gauge (three-fourths mil) corona treated, biaxially oriented and heat stabilized polypropylene film (YH* (*Reg. U. S. Pat. Off., W. R. Grace & Co.) Film, W. R. Grace & Co., Duncan, South Carolina) is primed at the rate of 0.2 pounds (dry solids) of a polyurethane type primer (Polybond GA–83 Polymer Industries, Inc. Springdale, Connecticut) per ream (3,000 ft²). The primer is applied from a 5 percent solution of ethyl acetate using a No. 4 Meyer bar. The primer is dried in a drum dryer having a drum temperature of 120°F and an air temperature of 230°F to drive off the solvent. Then the saran latex coating composition is coated onto the primer with a No. 6 Meyer bar to a thickness of 0.1 mil and dried as described above with respect to the primer. The coated film is found by visual observation to have excellent clarity.

Next the coated film is formed into three different laminates with three different saran coated cellophanes as indicated in the table which follows. First the polypropylene side of the just prepared coated film is coated with a polyurethane type glue (Polybond GA–59 Polymer Industries, Inc.) in a 35 percent ethylene acetate solution at the rate of about 1.3 pounds per ream (dry solids). The glue is applied with a 150 line gravure cylinder. The glue is dried by the previously described drying procedure. The glue coated film is then divided into three portions of about 200 ft. each and the glue is engaged with the cellophane side of the respective three saran coated cellophanes. The saran coating on the coated side of the cellophane in each case is of the high barrier type.

The laminate is then tested on a Woodman Form and Fill machine (Profit Maker No. V) which formed the laminate into bags by forming the film into a tubing with the saran coating side of the cellophane sealed with the coating composition of this invention. The bottom seal of each bag is then formed by sealing the saran coating of the cellophane to itself. The outside coating on the bag is thus the coating composition of this invention. The open end of top ends of the bags are then crimp sealed at 250°F. in the usual manner. The heat seals between the composition of this invention and the high barrier saran coating are formed on the Woodman Form and Fill machine by contacting the film with the heat seal bar at the bar temperature shown in the table below and the seal strength indicated in the table is obtained for this overlap seal.

| Laminate | SEAL STRENGTHS IN GRAMS PER INCH Saran Coated Cellophane | Sealer Bar Temp. 250°F | Sealer Bar Temp. 285°F |
|---|---|---|---|
| 1. | DuPont 210K404 | 274 | 332 |
| 2. | Olin 210V4 | 321 | 620 |
| 3. | Avisco 210RS7E | 570 | 594 |

The strength of the seal is determined by measuring the force required to peel 1 inch sections of sealed area apart using a Scott Tester (Model No. X–5 Scott Tester Inc.). The test is run without filling the bags with a product yet all of the empty bags produced fall freely from the crimp sealer jaws because of the high degree of hot release provided by the coating which in all cases in on the outside of the Form and Fill bags. The laminate is found to have excellent slip, hot release and sealability through visual observation. The laminate also had very good strength and is resistant to flex cracking even under extreme conditions of temperature and humidity. In addition good scuff and grease resistance is noted.

EXAMPLE II

The coating procedure of Example I is repeated except the aluminum silicate to saran copolymer weight ratio is 30/100 and the base material is glassine paper having a weight of 30 pounds per 3,000 feet with a barrier saran coating (Daran* (*Reg. U. S. Pat. Off., W. R. Grace & Co.) 220, W. R. Grace & Co. Cambridge, Mass.) on one side. The coating composition of this invention is applied to the uncoated side as in the previous Example. The coating is dried in a tunnel dryer at 300°F. Good vapor permeability of the coating is visually observed by the ready passage of the moisture from the paper during the drying of the coating.

The two side coated glassine is tested on the Woodman Form and Fill Machine as previously described. The coating composition of this invention was thus on the outside of the bag and the overlap seal was between the saran and the coating composition of this invention. The coating of this invention is found by visual observation to provide excellent slip, hot release and sealability. The test is run without filling the bags and the empty bags fall freely from the crimp sealer jaws because of the high degree of hot release provided by the coating. All form and fill bags have the coating on the outside in the test run. The coating is also observed to have good scuff and grease resistance and resistance to flex cracking.

I claim:

1. A coated article comprising a sheet paper product and a coating on said product; said coating comprising a blend of aluminum silicate and a copolymer of vinylidene chloride, said coating copolymer includes 50–95 percent by weight vinylidene chloride and the weight ratio of aluminum silicate to copolymer of vinylidene chloride is 10–50/100, said coating being permeable to gas and moisture vapor.

2. The coated article of claim 1 wherein said copolymer includes 60–85 percent by weight vinylidene chloride, the weight ratio of aluminum silicate to copolymer of vinylidene chloride is 20–40/100 and a wax having a melting point within the range of 150°–212°F is included in the coating in a weight ratio of wax to copolymer of vinylidene chloride of 1.5–3/100, said coating being 0.02 to 1 mil thick.

3. The coated article of claim 2 wherein said coating is 0.02 to 0.5 mil thick.

4. The coated article of claim 2 wherein the side of said sheet paper product opposite said coating is coated with a barrier copolymer of vinylidene chloride coating, said barrier coating forming a moisture and gas barrier.

* * * * *